United States Patent
Mosberger et al.

(10) Patent No.: US 6,438,597 B1
(45) Date of Patent: Aug. 20, 2002

(54) METHOD AND SYSTEM FOR MANAGING ACCESSES TO A DATA SERVICE SYSTEM THAT SUPPORTS PERSISTENT CONNECTIONS

(75) Inventors: David Mosberger, Fremont; James D. Salehi, Mountain View, both of CA (US)

(73) Assignee: Hewlett-Packard Company, Palo Alto, PA (US)

( * ) Notice: Subject to any disclaimer, the term of this patent is extended or adjusted under 35 U.S.C. 154(b) by 0 days.

(21) Appl. No.: 09/135,160

(22) Filed: Aug. 17, 1998

(51) Int. Cl.[7] .............................................. G06F 15/16
(52) U.S. Cl. ...................................................... 709/227
(58) Field of Search ................................ 709/227, 229, 709/203, 219; 370/464

(56) References Cited

U.S. PATENT DOCUMENTS

| | | | | |
|---|---|---|---|---|
| 5,623,605 A | * | 4/1997 | Keshav et al. | 709/236 |
| 5,778,372 A | * | 7/1998 | Cordell et al. | 707/100 |
| 5,852,717 A | * | 12/1998 | Bhide et al. | 709/203 |
| 5,852,718 A | * | 12/1998 | Van Loo | 709/208 |
| 5,857,201 A | * | 1/1999 | Write, Jr. et al. | 707/104 |
| 5,905,872 A | * | 5/1999 | DeSimone et al. | 709/246 |
| 5,949,866 A | * | 9/1999 | Coiera et al. | 379/210 |
| 6,003,084 A | * | 12/1999 | Green et al. | 709/227 |
| 6,020,884 A | * | 2/2000 | MacNaughton et al. | 345/329 |
| 6,061,692 A | * | 5/2000 | Thomas et al. | 707/200 |
| 6,088,805 A | * | 7/2000 | Davis et al. | 713/202 |
| 6,094,423 A | * | 7/2000 | Alfano et al. | 370/310 |
| 6,101,482 A | * | 8/2000 | DiAngelo et al. | 705/26 |
| 6,138,152 A | * | 10/2000 | Jalote et al. | 709/219 |
| 6,182,142 B1 | * | 1/2001 | Win et al. | 709/229 |
| 6,266,701 B1 | * | 7/2001 | Sridhar et al. | 709/232 |

* cited by examiner

Primary Examiner—Moustafa M. Meky
Assistant Examiner—Bradley Edelman

(57) ABSTRACT

A connection management system for a data service system that is accessible through a plurality of access requests includes a request classifier that classifies each of the access requests as either a persistent connection request or a non-persistent connection request based on a predetermined classification policy. The connection management system also includes a persistent connection request processor that allows a connection established for a persistent connection request from a first remote user terminal to remain open after the request is processed by the data service system. A non-persistent connection request processor is also included in the connection management system that causes a connection established for a non-persistent connection request from a second remote user terminal to be closed after the non-persistent connection request is processed by the data service system. In addition, a method of managing connections of the data service system is also described.

20 Claims, 6 Drawing Sheets

METHOD AND SYSTEM FOR MANAGING ACCESSES TO A DATA SERVICE SYSTEM THAT SUPPORTS PERSISTENT CONNECTIONS

BACKGROUND OF THE INVENTION

1. Field of the Invention

The present invention pertains to data access network systems. More particularly, this invention relates to a system and method for managing accesses to a data service system that supports persistent as well as non-persistent connections.

2. Description of the Related Art

Traditionally, an HTTP (Hyper Text Transport Protocol) transaction between a user terminal and a data service system is performed using the transaction's own TCP (Transmission Control Protocol) connection. Thus, to complete a transaction, the user's browser first establishes a TCP connection to a server within the data service system. The browser then sends the access request and waits for the reply from the server. Meanwhile, the access request received in the server of the data service system is processed by server applications in the server to generate the reply. Once the browser receives the reply from the server, the browser reads the reply and then the server closes the connection. When the browser then receives another access request, it repeats the above mentioned steps to complete another transaction.

One problem of this prior art is that when the server is under heavy load, creating a connection can be very slow. This slow connection creation impacts all users equally. Another problem is the waste in system resources when, for example, a subsequent access request accesses the same location in the server. In this case, connection does not need to be closed after the transaction for the prior access request has been completed and then re-established for the subsequent access request.

To alleviate the above mentioned problems, an improved version of HTTP protocol (i.e., HTTP/1.1) has been introduced which supports persistent connections. A persistent connection typically refers to a connection that is not closed (i.e., remains to be open) after its access request has been transferred, processed, and replied. In this case, a browser that supports persistent connections leaves the connection to the server open after handling the first transaction. As long as the connection remains open, the browser can reuse the connection for as many requests to the server as it desires. There are several advantages to using persistent connections. First, instead of many short-lived connections, a single long-lived connection allows the TCP to run better because its flow-control and congestion-control logic will have sufficient time to reach a stable state. Secondly, the connection overhead can be reduced dramatically. As is known, opening and closing a TCP connection typically involves the exchange of seven network packets of data. This is often a significant overhead as an access request typically fits into a single data packet and a reply to an access request is often just a few packets long. Thirdly, the persistent connections allow access requests to be pipelined on a persistent connection. This means that the network round-trip time can be amortized across multiple requests. This eliminates or at least reduces the need for creating multiple concurrent connections to the same server.

However, disadvantages are associated with this prior approach. One disadvantage is that a significant amount of system resources (e.g., CPU, memory) of the server is required to maintain the connections open (i.e., persistent). At the very least, a persistent connection occupies a TCP socket (e.g., Unix socket) and associated receiving and sending buffers. In the worst case, a persistent connection may keep an entire server process busy.

Another disadvantage associated is that a persistent connection may be idle for a long period of time before the next request is received in the server through this connection. This may become a problem if most of the persistent connections are idle most of the time. In other words, while persistent connections can greatly improve server performance as perceived by a user and reduce congestion in the network, server utilization may actually decrease due to idling persistent connections that occupy the server resources. In addition, an idling persistent connection may not allow a new access request from a new user since the server may limit the number of available connection slots to a fixed number.

SUMMARY OF THE INVENTION

One feature of the present invention is to classify access requests to a data service system as persistent connection requests and non-persistent connection requests.

Another feature of the present invention is to allow a data service system that supports persistent connections to provide services to its users based on the classes that the users belong to.

Another feature of the present invention is to improve the throughput and response time of a data service system that supports persistent connections.

A further feature of the present invention is to allow a data service system to take advantage of persistent connections while allowing maximized utilization of the server resources.

A still further feature of the present invention is to improve overload behavior of a data service system that supports persistent connections.

A connection management system for a data service system that is accessible through a plurality of access requests includes a request classifier that classifies each of the access requests as either a persistent connection request or a non-persistent connection request based on a predetermined classification policy. The connection management system also includes a persistent connection request processor that allows a connection established for a persistent connection request from a first remote user terminal to remain open after the request is processed by the data service system. A non-persistent connection request processor is also included in the connection management system that causes a connection established for a non-persistent connection request from a second remote user terminal to close after the request is processed by the data service system.

A method of managing connections to a data service system that is accessible through a plurality of access requests includes the step of classifying each of the access requests as either a persistent connection request or a non-persistent connection request based on a predetermined classification policy. The method then allows a connection established for a persistent connection request from a first remote user terminal to remain open after the persistent connection request is processed by the data service system. The method also causes a connection established for a non-persistent connection request from a second remote user terminal to be closed after the non-persistent connection request is processed by the data service system.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
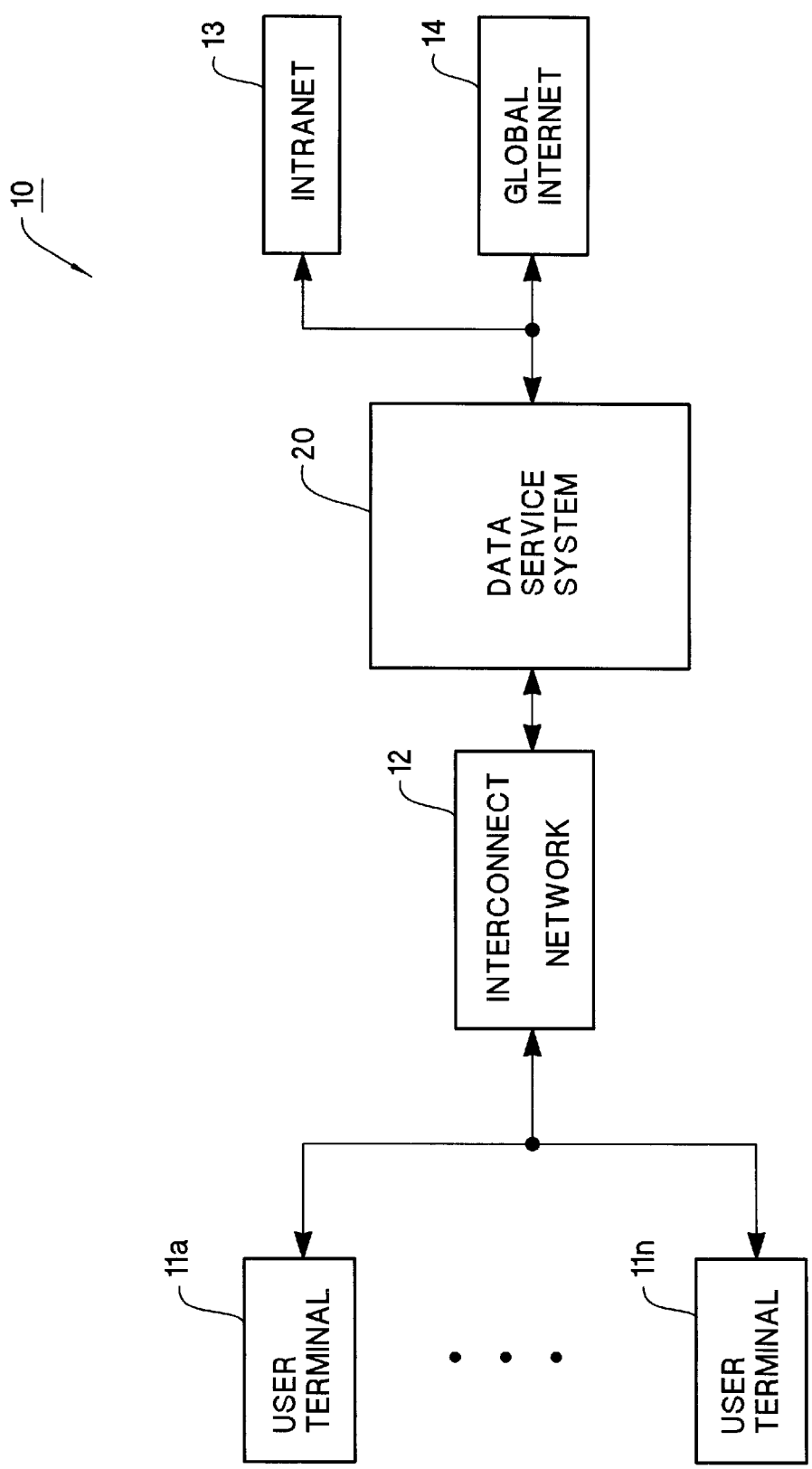
FIG. 1 shows a data access network system that includes a data service system.

FIG. 1 shows a data access network system 10 that includes a data service system 20 that implements one embodiment of the present invention. The data service system 20 can be, for example, employed by an Internet/Intranet Service Provider (ISP) to offer data services (e.g., web, news, or advertisement) and other services (e.g., e-commerce, e-mail) to users or subscribers connected to the data service system 20.

As will be described in more detail below, the data service system 20 provides class-based services using persistent and non-persistent connections. The data service system 20 includes a connection management system (i.e., the system 100 in FIG. 3) that implements one embodiment of the present invention. The connection management system 100 is located in a TCP (or other protocol)-based server (shown in FIGS. 2 and 3) of the data service system 20. A TCP-based server is the server that can close the connections (i.e., has the control over the life of the connections) and can handle classifiable requests. A TCP-based server contains a number of content sites. A content site refers to a collection of data (e.g., a database or a file system) that contain a set of content data and/or applications for access. The content sites can be accessed by multiple users at the same time.

In accordance with one embodiment of the present invention, the connection management system 100 classifies each of the access requests to the data service system 20 either as a persistent connection request or as a non-persistent connection request such that tiered or class-based services can be offered to the users of the data service system 20. The connection management system 100 allocates persistent connections to some of the access requests in accordance with a predetermined classification and allocation policy. The remaining access requests are classified as the non-persistent connection requests. In this case, the requests are modified to allow the connections to be closed as soon as these non-persistent connection requests are processed. This provides a two-level tiered services to the users of the data service system 20 in which the persistent connection requests can be treated as the premium user class while the non-persistent connection requests are treated as the basic user class.

The connection management system 100 also prevents the data service system 20 from being overloaded with persistent connections by limiting the maximum number of persistent connections permitted in the data service system 20. The connection management system 100 allows the data service system 20 that supports persistent connections to provide tiered or class-based services to its users. The connection management system 100 also improves the throughput and response time of the data service system 20. The connection management system 100 allows the data service system 20 to take advantage of the persistent connections without risking locking out users needlessly. The connection management system 100 also improves the overload behavior of the data service system 20.

In accordance with one embodiment of the present invention, the connection management system 100 includes a request classifier (i.e., the classifier 101 in FIG. 3) that classifies each of the access requests received from entities external to the data service system 20 that hope to access the data service system 20. The request classifier 101 classifies the access requests as either persistent connection requests or non-persistent connection requests based on the predetermined classification policy. The predetermined classification policy may be based on the unique sender address (or the sender's domain name) of each of the access requests, the tag information, a cookie, a browser plug-in value, a path name in the host address, or a URL locator contained in each of the access requests. Alternatively, the classification can be based on the time of arrival of each of the access requests.

The connection management system 100 also includes a persistent connection request processor (i.e., the processor 102 in FIG. 3) that allows a connection established for a persistent connection request to remain open after the request is processed by the data service system 20. A non-persistent connection request processor (i.e., the processor 103 in FIG. 3) is also included in the connection management system 100 that causes a connection established for a non-persistent connection request to close after the request is processed by the data service system 20. The access processing system 100 will be described in more detail below, also in conjunction with FIGS. 1–6.

Referring to FIG. 1, the data access network system 10 includes a global Internet 14 and an Intranet 13 connected to the data service system 20. Each of the global Internet 14 and Intranet 13 includes a number of data service systems connected together via a network. The data service system 20 can be accessed from the global Internet 14 or Intranet 13. This means entities from Internet 14 or Intranet 13 can send access requests to the data service system 20. Data communications among all the data service systems (including the data service system 20) are conducted using a predetermined open standard communication protocol for Internet/Intranet communications. In one embodiment, the open standard communication protocol is the Hyper Text Transport Protocol (i.e., HTTP). Alternatively, other known communication protocols for Internet/Intranet communications can also be used. Each of the data service systems in the Intranet 13 and Internet 14 has substantially the same functional structure as the data service system 20 although the physical configuration of these data service systems may be different from the data service system 20 and from each other.

The data service system 20 is also connected to a number of user terminals 11a through 11n via an interconnect network 12. Each of the user terminals 11a–11n can access the data service system 20 or other data service systems in the global Internet 14 or Intranet 13 via the interconnect network 12. The interconnect network 12 can be any known network, such as Ethernet, ISDN (Integrated Services Digital Network), T-1 or T-3 link, FDDI (Fiber Distributed Data Network), cable network, or telephone line network.

Each of the user terminals 11a–11n may be at a residence, a school, or an office of the user. Each of the user terminals 11a–11n may include a web browser application program (or an e-mail or e-commerce application program) that allows the user to access the data services offered by the data service system 20 or other data service systems in the global Internet 14 or Intranet 13.

Each of the user terminals 11a–11n can be, for example, a personal computer, a network computer, a notebook computer, a workstation, mainframe computer, a supercomputer. Alternatively, each of the user terminals 11a–11n can be any other electronic system with data processing capabilities. For example 11a, an Internet-enabled TV may be used for one or each of the user terminals 11a–11n. In addition, each of the user terminals 11a–11n may include a modem or network adaptor, depending on the network technology adopted for the interconnect network 12. Alternatively, each of the user terminals 11a–11n can be an electronic device that can send out HTTP requests.

Figure 2:
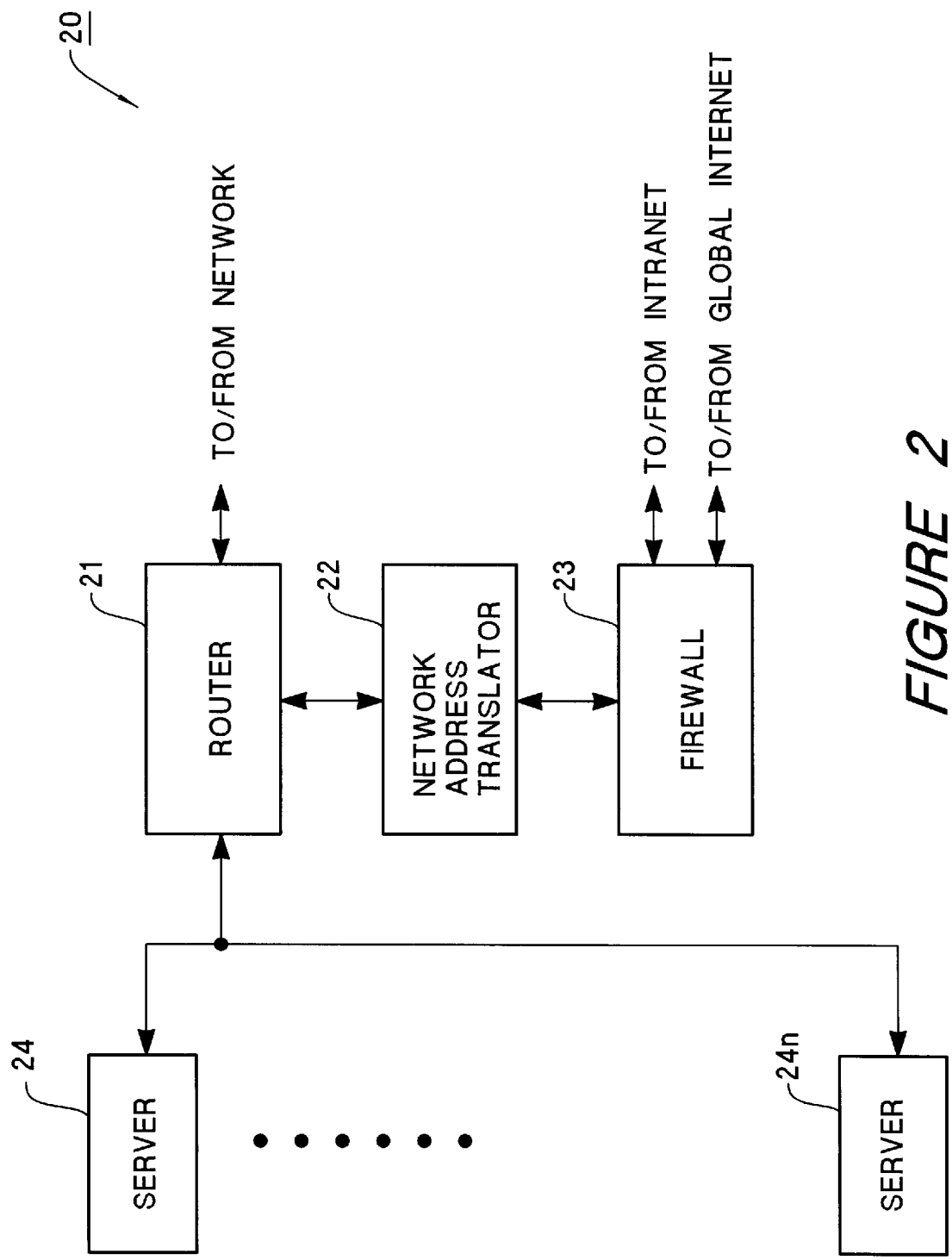
FIG. 2 shows the structure of data service system that includes a number of servers.

The data service system 20 provides data access services contracted by its customers to its users (e.g., at the user terminals 11a–11n and/or from the global Internet 14 or Intranet 13). The data services offered by the data service system 20 can be, for example, web, news, e-mail, e-commerce, advertisement, or other types of data services. Here, a customer means the entity contracting with the data service system 20 to have its content hosted in the data service system 20, or to have its services (e.g., e-commerce, e-mail, or news group) offered through the data service system 20. A user means the entity accessing one or more of the content sites hosted in the data service system 20. The user can be accessing the data service system 20 from one of the user terminals 11a–11n or an entity from the global Internet 14 or Intranet 13. FIG. 2 shows the functional structure of the data service system 20, which will also be described in more detail below.

Referring to FIG. 2, the data service system 20 includes a number of servers 24 through 24n, a router 21, a network address translator 22, and a firewall 23. The router 21 is used for routing data to and from various modules within the data service system 20. The router 21 functions to connect the remote user terminals (e.g., the terminal 11a) to the appropriate servers 24–24n, or to the global Internet 14 or Intranet 13 via the firewall 23.

The network address translator 22 translates between a "private" address and a "public" address. The "private" address is used for a user to access the servers 24–24n within the data service system 20 and the "public" address is used for the user to access web sites in the global Internet 14 and Intranet 13. In cases when subscriber terminals are assigned "public" addresses directly, the system 20 does not include the network address translator 22. The firewall 23 controls access to and from the system 20 from the global Internet 14 and Intranet 13. The Firewall 23 may be implemented in hardware or software and are included to enhance security of the system 20.

The servers 24–24n may include web content servers, e-mail servers, news servers, e-commerce servers, domain name servers (DNSs), address assignment servers (e.g., Dynamic Host Configuration Protocol servers), proxy servers, subscription management servers, advertisement servers, and session manager servers. In addition, the servers 24–24n may include other servers. The web content servers, e-mail servers, news servers, e-commerce servers, and advertisement servers can be collectively referred to as local service servers.

The local service servers store contents that include Hyper-Text Markup Language (HTML) web pages, database objects, gif images, video clips, etc. Data transfers to and from the local service servers are enabled by transport protocols such as Transport Control Protocol (TCP) and the User Datagram Protocol (UDP). The local service servers support a variety of Internet applications to provide services such as access to the World Wide Web, electronic mail, bulletin boards, chat rooms, and news groups. Using web browser and other client applications, users can access Web pages, news, and e-mail stored in the local service servers via their terminals. In addition, the users can also access Web pages located at remote sites of the global Internet 14 or Intranet 13.

The address assignment servers assign an address to a user terminal when it first accesses the data service system 20. Specialized address assignment protocols such as Dynamic Host Configuration Protocol (DHCP) are used by the address assignment servers to assign addresses to user terminals. The proxy servers may be used to enhance security of accesses to and from the user terminals (e.g., the terminal 11n), as well as to speed up Internet access by caching frequently accessed data locally.

The DNS servers provide mapping between host names and network addresses. This process is referred to as name resolution. Before accessing a web content server, the user's web browser application first contacts one of the DNS servers to find out the network address of the web content server. If the resolution fails, the web transfer is aborted.

Figure 3:
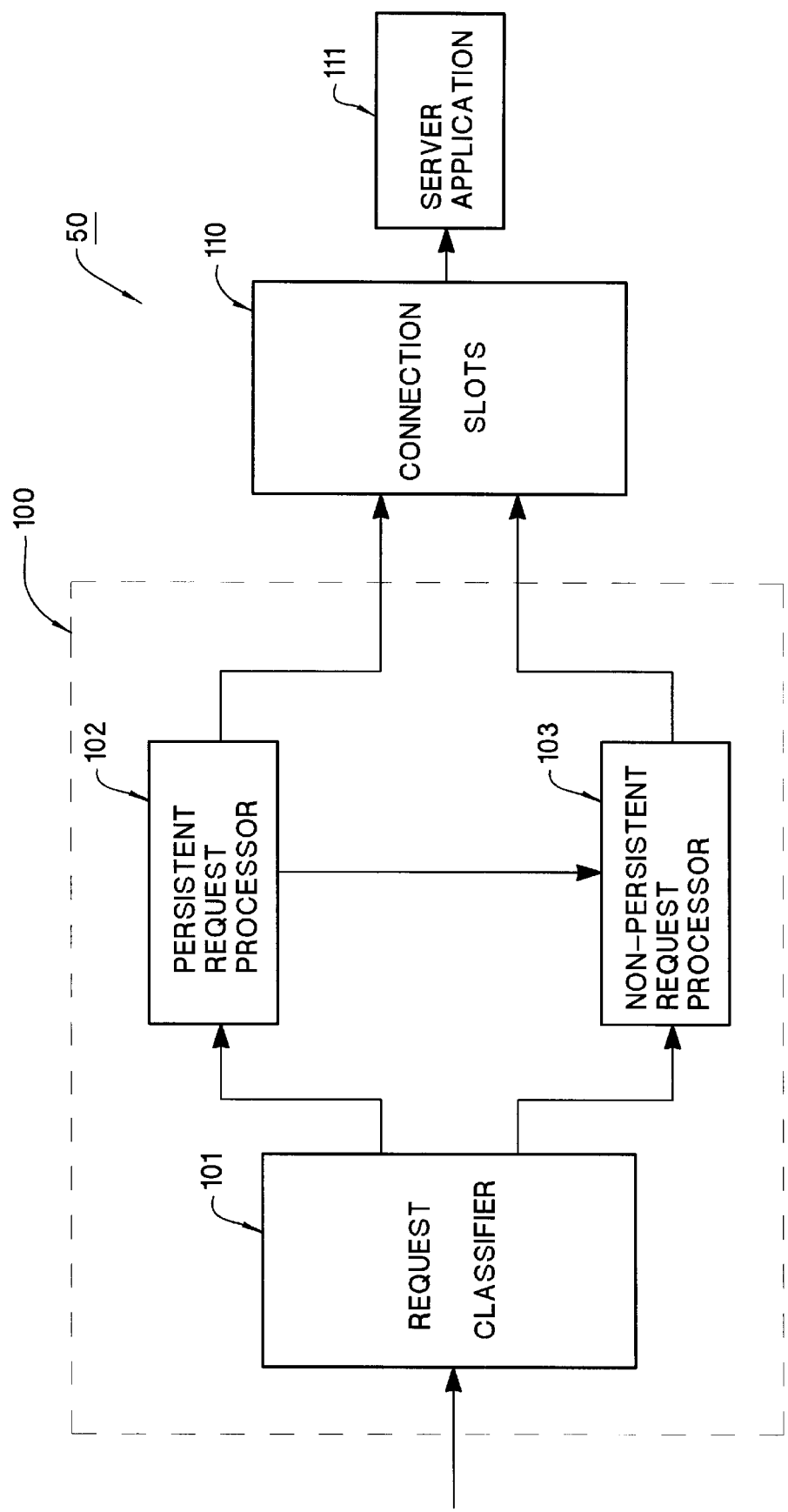
FIG. 3 shows the structure of one of the servers of FIG. 2 that includes a connection management system that implements one embodiment of the present invention.

Each of the servers 24–24n can be a TCP-based (or other transmission protocol-based) server or a non-TCP-based server. A TCP-based server can handle classifiable access requests to the contents hosted in the server. In addition, a TCP-based server allows a connection established for handling an access request to remain open after the processing of the access request has been completed. An example of a TCP-based server is a web content server, an e-mail server, a news server, an e-commerce server, a local service server, a domain name server, and a proxy server. An example of a non-TCP-based server is an address assignment server. Some TCP-based servers of the servers 24–24n include a number of content sites. If a TCP-based server is a web server, then the content sites are web sites, each of which contains a number of web pages. FIG. 3 shows the structure of a TCP-based server 50 which can be any one of the TCP-based servers of the servers 24–24n.

As can be seen from FIG. 3, the server 50 includes a server application 111 that enables or executes multiple processes or threads to provide accesses to a number of content sites (not shown in FIG. 3) located in the server 50. Each of the content sites can be constructed using known Internet technology. If each of the content sites is a World Wide Web sites, the server application 111 is a World Wide Web server application. The server application 111 can be any known server application program of a server in a data service system and will not be described in more detail below.

The server application 111 is a persistent connection server application. This means that the server application 111 does not close the connection for the access request after the request has been processed. In addition, the server application 111 does not release or free up the persistent connection slot after the request has been processed. Alternatively, the server application 111 can be other types of server application.

The server 50 also includes connection slots 110. Each of the connection slots 110 allows connection for an access request to be established such that the access request can be passed to the server application 111 for processing. Thus, the connection slots 110 are like sockets to the server application 111. Each of the connection slots 111 can be used as a persistent connection slot or a non-persistent connection slot. If a connection slot is reserved as the persistent connection slot, the server application 111 does not release the connection slot after the request has been handled. If a connection slot is reserved as the non-persistent connection slot, the server application 111 closes the connection and releases the connection slot after the request has been handled.

In order to prevent the server 50 from being overloaded with persistent connections, a predetermined maximum number of connection slots of the connection slots 110 are allowed to be reserved for persistent connection. Once the number is met, any incoming request that has been classified as persistent request will be processed as non-persistent request. In one embodiment, the maximum numbers of persistent and non-persistent connection slots are two hundred seventy and thirty, respectively.

The server 50 also includes the connection management system 100 connected to the server application 111 via the connection slots 110. The connection management system 100 receives all the access requests to the server application 111 before they are supplied to the server application 111 via the connection slots 110. As described above and in accordance with one embodiment of the present invention, the connection management system 100 provides class-based services using persistent and non-persistent connections. The connection management system 100 classifies each of the access requests as either persistent connection requests or non-persistent connection requests based on the predetermined classification policy. The connection management system 100 also allows a connection established for a persistent connection request to remain open after the request is processed by the data service system 20. The connection management system 100 also causes a connection established for a non-persistent connection request to close after the request is processed by the data service system 20.

The classification policy may allow classification of the access requests received in the request classifier 101 to be based on one of a number of criteria. For example, the classification policy can be based on the unique sender IP (Internet Protocol) address of each of the user access requests. As is known, each request has a unique sender IP address which identifies the user when sending an access request. This IP address can be used to classify the user access requests received in the classifier 101. In this case, the classification policy provides a list of sender IP addresses for a class. For example, the policy may specify a list of sender IP addresses as belonging to a first class (e.g., primary class) and another list of sender IP addresses as belonging to a second class (e.g., secondary class). A lookup table or hash table can be created that specifies which sender EP address belongs to which class. In addition, the classification policy can be based on the sender's domain name.

As an another example, the classification policy can be based on a tag value contained in each of the access requests. The tag value can be a cookie or a browser plug-in value. A particular cookie is typically sent from a content site to the user terminal when the user first accesses that content site. After that, the cookie is attached to any access request accessing the content site from that user terminal. More specifically, a cookie allows a content site (especially a world wide web site) to deliver data to a user, request that the user store the data, and return the data to the content site whenever the user accesses the content site. A browser plug-in value is a unique value generated from a particular web browser. This means that each web browser generates its own unique browser plug-in value. The browser plug-in values allow the content site to recognize the user terminals from which the access requests are generated. When cookies are used, the classification policy may specify which cookies belong to what class. One or more cookies can belong to one class. This is similar to the sender IP address scheme. When browser plug-in values are used, the classification policy may specify which plug-in values belong to what class. One or more plug-in values may belong to one class. This is also similar to the sender IP address scheme.

The cookies can be created when users of a content site subscribe to the services provided by the content site. In this case, the cookies identify to which class a particular user is subscribed (e.g., flat fee class or pay-per-use class). Then the cookie is sent back to the content site with the access request to identify the class to which the user belongs whenever the user is accessing the content site. Alternatively, the cookies can also be assigned dynamically.

Moreover, the classification policy may be based on the contents accessed. This can be done using pathnames contained in access requests. As is known, the URL address of an access request typically includes a host address and a path name. The path name is used to access a particular page (or a portion of data) within that content site. This is important because in this case, the data service system 20 can treat some content more important than other content.

Alternatively, the classification policy may classify all the incoming requests as the persistent connection requests. In this case, if there is no persistent connection slot available in the connection slots 110, then the newly classified persistent connection request is sent from the persistent request processor 102 to the non-persistent request processor 103 and the request is processed as a non-persistent connection request.

The connection management system 100 can be implemented by hardware, software, or firmware. In one embodiment, the connection management system 100 is implemented by software. In this case, the connection management system 100 can be implemented independent of the server application 111.

The above implementation means that the connection management system 100 is transparent to the server application 111 and is not integrated into the server application 111. The advantage of this approach is that no modification to the existing server application is required and the connection management system I 00 can work with generic, off-the-shelf server infrastructure software (assuming the software is built with some type of dynamic linking). Alternatively, the properties and functions of the connection management system I 00 may be integrated into the server application 111. In this case, modification of existing server application to incorporate the functions is required.

Figure 4:
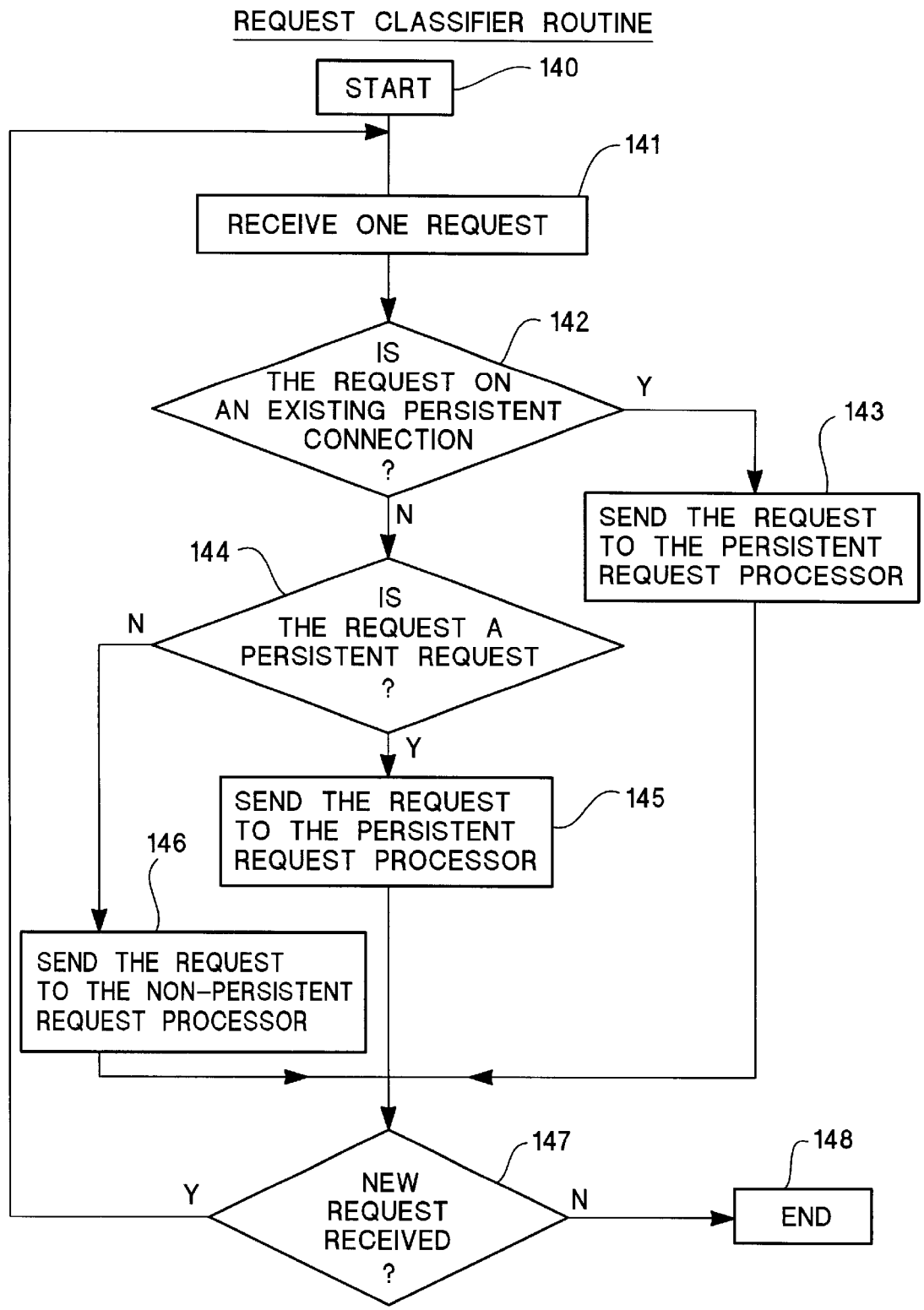
FIG. 4 is the flow chart diagram of the process implemented by the request classifier of FIG. 3.

The connection management system 100 includes a request classifier 101. The classifier 101 classifies the access requests into either persistent connection requests or non-persistent connection requests in accordance with the predetermined classification policy. FIG. 4 shows the process of the classifier 101, which will be described in more detail below.

Figure 5:
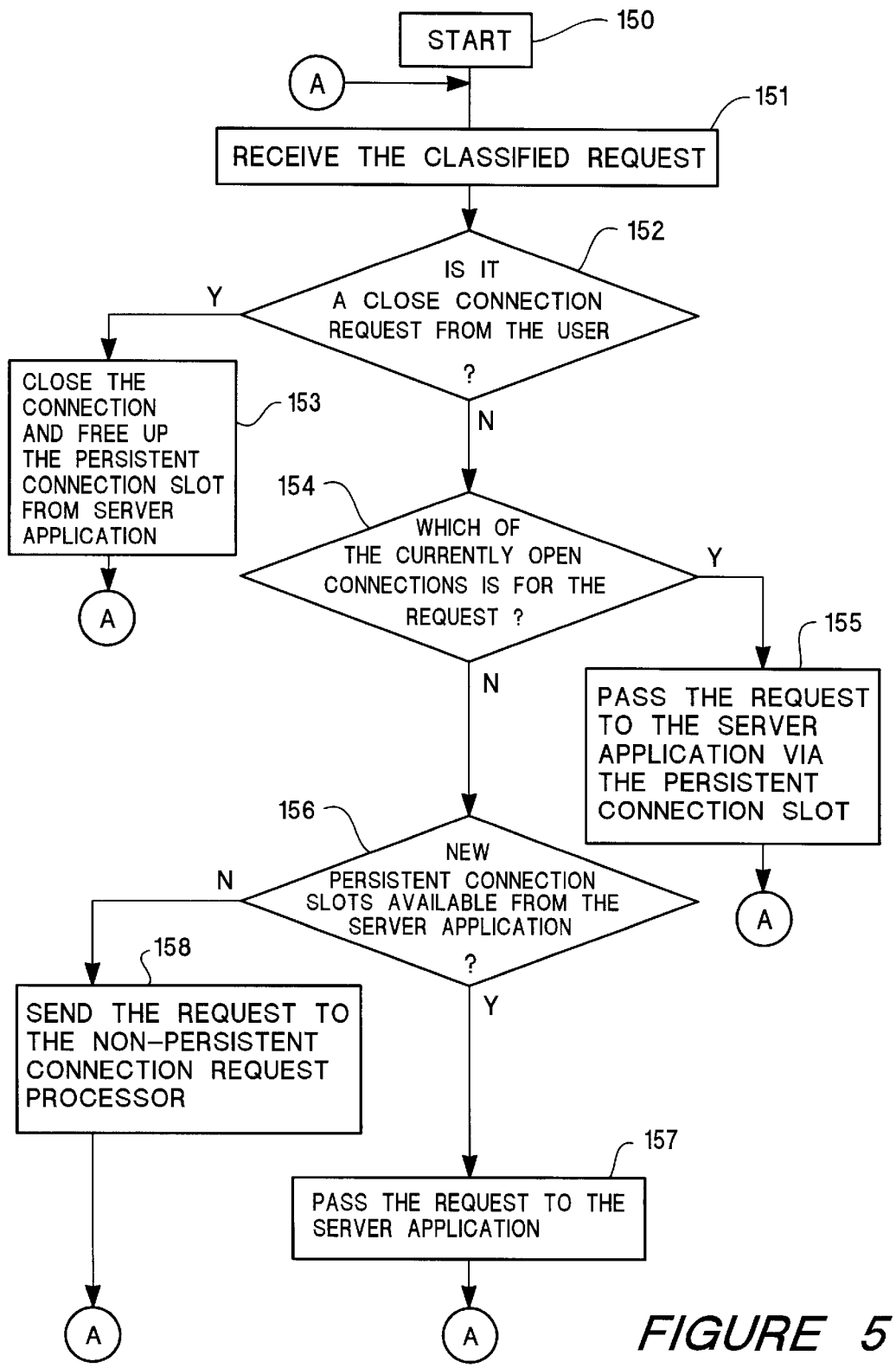
FIG. 5 is the flow chart diagram of the process implemented by the persistent connection request processor of FIG. 3.

The connection management system 100 also includes a persistent request processor 102 and a non-persistent request processor 103. The persistent request processor 102 receives the persistent connection requests from the classifier 101. The persistent request processor 102 then determines if the request is a request to close a particular connection. If so, the request is sent to the server application 111 via the connection slot for that particular connection. If the request is not a request to close a connection, the persistent request processor 102 then determines if the request is for a currently open connection. If so, the persistent request processor 102 sends the request to the server application 111 through that connection slot. If the request is a new persistent request, then the persistent request processor 102 determines if there is any persistent connection slot available for reservation (i.e., if the total number of currently opened persistent connections have not exceeded the maximum number allowed for the persistent connections). If not (i.e., no persistent connection slot available), the request is forwarded to the non-persistent request processor 103 to be processed as a non-persistent connection request. If so, a connection slot is reserved as a persistent connection slot to pass the request to the server application 111. FIG. 5 shows the process of the persistent request processor 102, which will be described in more detail below.

Figure 6:
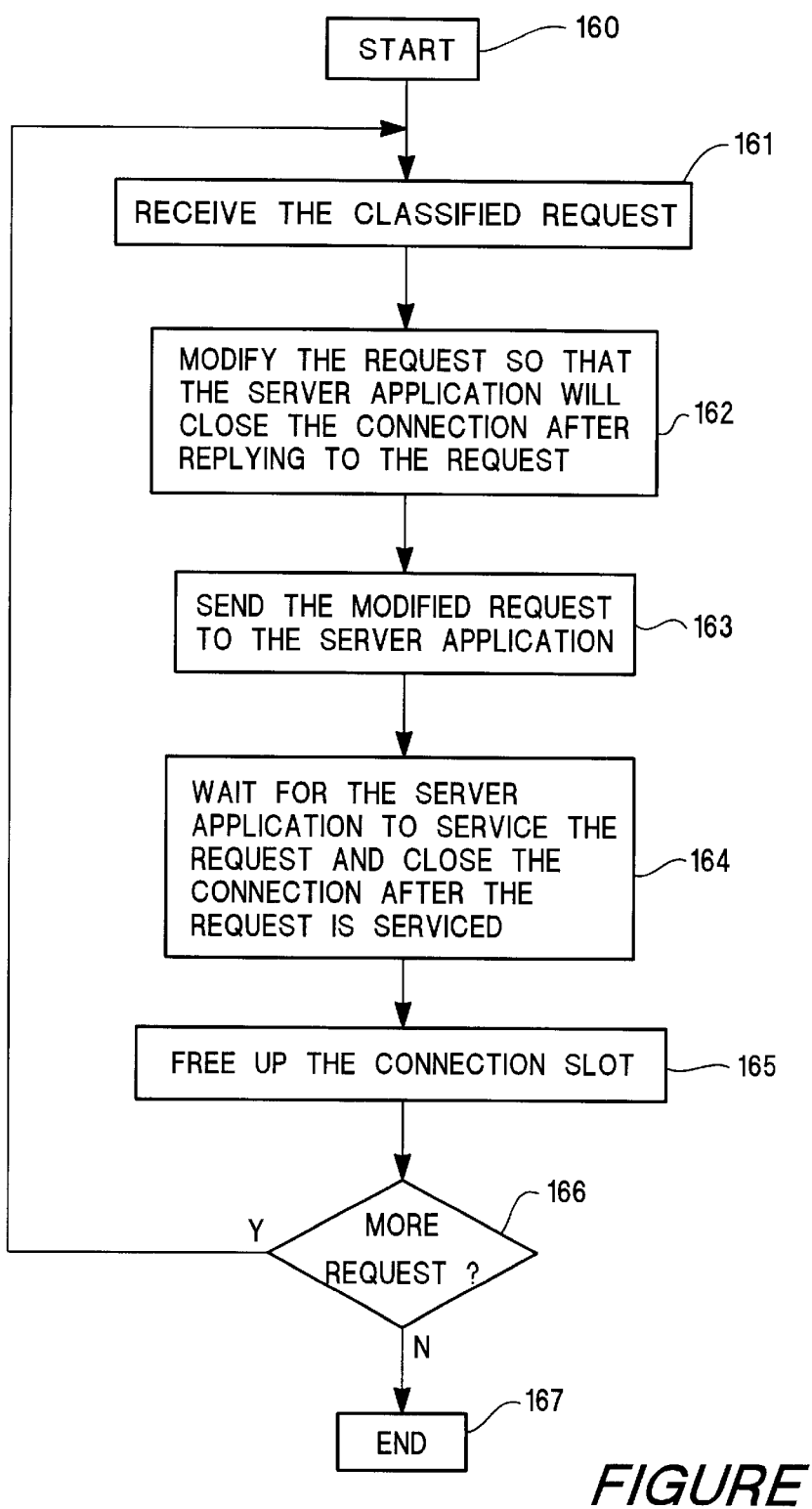
FIG. 6 is the flow chart diagram of the process implemented by the non-persistent connection request processor of FIG. 3.

The main function of the non-persistent request processor 103 is to modify the request such that the connection slot reserved for the non-persistent connection request can be released after the request is processed and a reply to the request has been sent via the connection slot. Alternatively, the processor 103 marks the request such that the connection slot reserved for the non-persistent connection request can be released after the request is processed and a reply to the request has been sent via the connection slot. FIG. 6 shows the process of the non-persistent request processor 103, which will be described in more detail below.

In another embodiment, when the processor 103 is integrated into the server application 111, the processor 103 will ensure that the connection slot reserved for the non-persistent connection request can be released after the request is processed and a reply to the request has been sent via the connection slot.

FIG. 4 shows the flow chart diagram of the process of the request classifier 101 of FIG. 3. As can be seen from FIG. 4, the process starts at the step 140. At the step 141, the classifier 101 receives a request. At the step 142, the classifier 101 determines whether the request is on an existing persistent connection. This means whether the request will use an already opened connection. If the answer is yes at the step 142, then the request is passed to the persistent request processor 102 at the step 143. If the answer is no at the step 142, then the classifier 101 further determines if the request is a persistent request based on a predetermined classification policy at the step 144. If the answer is yes at the step 144, then the request is sent to the persistent request processor 102 at the step 145. If the answer is no at the step 144, then the request is sent to the non-persistent request processor 103 at the step 146. At the step 147, it is determined if there are any new requests received at the classifier 101. If so, the process returns to the step 141. If not, the process ends at the step 148.

It is to be noted that the step 142 may be skipped or omitted in some implementations or configurations. In this case, the process of FIG. 4 continues to the step 143 from the step 141.

FIG. 5 shows the flow chart diagram of the process of the persistent request processor 102 of FIG. 3. As can be seen from FIG. 5, the process starts at the step 150. At the step 151, the persistent request processor 102 receives a request forwarded from the classifier 101. At the step 152, the persistent request processor 102 determines if the request is a close connection request. If so, the process moves to the step 153 at which the persistent request processor 102 closes the connection and frees up the persistent connection slot from the server application 111. The process then moves to the step 151.

If, at the step 152, it is determined that the request is not a close connection request, then the step 154 is executed. At the step 154, it is determined if the request is on an existing persistent connection. If so, the persistent request processor 102 passes the request to the server application 111 via that persistent connection slot within the connection slots 110 at the step 155. Then the process moves to the step 151.

If, at the step 154, it is determined that the request is not on an existing persistent connection, then the persistent request processor 102 determines if there is a new persistent connection slot available from the connection slots 110 at the step 156. If so, the persistent request processor 102 secures that persistent connection slot and passes the request to the server application via that secured persistent connection slot at the step 157. Then the process moves to the step 151. If, at the step 156, it is determined that there is no new persistent connection slot available from the connection slots 110, then the persistent request processor 102 executes the step 158 at which the persistent request processor 102 sends the request to the non-persistent request processor 103. In this case, the request is treated as a non-persistent request. The process then moves to the step 151, waiting to receive a new request.

FIG. 6 shows the flow chart diagram of the process of the non-persistent request processor 103 of FIG. 3. As can be seen from FIG. 6, the process starts at the step 160. At the step 161, the non-persistent request processor 103 receives a request forwarded either from the classifier 101 or the persistent request processor 102. At the step 162, the request is modified or marked so that the server application 111 will close the connection established for the request and release or free up the connection slot after the request is processed and response is sent.

In one embodiment, the request can be modified by adding a "Connection: close" header before performing normal HTTP processing. In another embodiment, the request is modified by transforming the request version number from 1.1 to 1.0. In a further embodiment, the request is modified by modifying the HTTP processing in the server application 111 such that the server application 111 will close the connection after processing the particular request.

In another embodiment, the request is marked as a non-persistent connection request by (1) closing the client-to-server half of the connection or (2) generating an artificial "close connection" request.

At the step 163, the non-persistent request processor 103 sends the modified request to the server application 111 via one of the available non-persistent connection slots of the connection slots 110 reserved by the non-persistent request processor 103. At the step 164, the non-persistent request processor 103 waits for the server application 111 to service the request and close the connection slot after the request is serviced. At the step 165, the non-persistent request processor 103 then release the reserved connection slot from the connection slots 110. At the step 166, it is determined if more requests are received in the non-persistent request processor 103. If so the step 161 is again performed. If not, the process ends at the step 167.

In the foregoing specification, the invention has been described with reference to specific embodiments thereof It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A connection management system for a data service system that is accessible through a plurality of access requests, comprising:
   (A) a request classifier that classifies each of the access requests as either a persistent connection request or a non-persistent connection request based on a predetermined classification policy, wherein the request classifier is configured to classify an access request received from a user terminal based upon a service class assigned to the user terminal;
   (B) a persistent connection request processor that allows a connection established for a persistent connection request to remain open after the request is processed by the data service system;
   (C) a non-persistent connection request processor that causes a connection established for a non-persistent connection request to be closed after the request is processed by the data service system.

2. The connection management system of claim 1, wherein the persistent connection request processor allows the connection to remain open when the persistent connection request processor determines that the persistent connection request is not a last request from a first user terminal.

3. The connection management system of claim 2, wherein the persistent connection request processor causes the connection to close when the persistent connection request processor determines that the persistent connection request is a last request from the first user terminal.

4. The connection management system of claim 1, wherein the non-persistent request processor causes the connection established for the non-persistent connection request to close by modifying the request so that the data service system closes the connection after the non-persistent connection request is processed.

5. The connection management system of claim 1, wherein the connection management system is not integrated into a server application and is transparent to the server application.

6. The connection management system of claim 1, wherein the persistent connection request processor is configured to allow a connection to be established for a persistent connection request in accordance with a communication protocol, and the non-persistent connection request processor is configured to cause a connection to be established for a non-persistent connection request in accordance with the same communication protocol.

7. The connection management system of claim 1, wherein the request classifier is configure classify an access request based upon information contained in the access request.

8. A connection management system for a data service system that is accessible through a plurality of access requests, comprising:
   (A) a request classifier that classifies each of the access requests as either a persistent connection request or a non-persistent connection request based on a predetermined classification policy;
   (B) a persistent connection request processor that allows a connection established for a persistent connection request to remain open after the request is processed by the data service system;
   (C) a non-persistent connection request processor that causes a connection established for a non-persistent connection request to be closed after the request is processed by the data service system;
      wherein the data service system supports a predetermined number of persistent connections and the request classifier classifies a subsequent access request as a non-persistent connection request when the persistent connections currently in the data service system exceed the predetermined number.

9. A connection management system for a data service system that is accessible through a plurality of access requests, comprising:
   (A) a request classifier that classifies each of the access requests as either a persistent connection request or a non-persistent connection request based on a predetermined classification policy, wherein the predetermined classification policy allows classification of the access requests based on access request sender addresses or domain names;
   (B) a persistent connection request processor that allows a connection established for a persistent connection request to remain open after the request is processed by the data service system;
   (C) a non-persistent connection request processor that causes a connection established for a non-persistent connection request to be closed after the request is processed by the data service system.

10. A connection management system for a data service system that is accessible through a plurality of access requests, comprising:
    (A) a request classifier that classifies each of the access requests as either a persistent connection request or a non-persistent connection request based on a predetermined classification policy, wherein the predetermined classification policy allows classification of the access requests based on a cookie or a browser plug-in value;
    (B) a persistent connection request processor that allows a connection established for a persistent connection request to remain open after the request is processed by the data service system;
    (C) a non-persistent connection request processor that causes a connection established for a non-persistent connection request to be closed after the request is processed by the data service system.

11. A connection management system for a data service system that is accessible through a plurality of access requests, comprising:
    (A) a request classifier that classifies each of the access requests as either a persistent connection request or a non-persistent connection request based on a predetermined classification policy, wherein the predetermined classification policy allows classification of the access requests based on a path name or a URL locator;
    (B) a persistent connection request processor that allows a connection established for a persistent connection request to remain open after the request is processed by the data service system;
    (C) a non-persistent connection request processor that causes a connection established for a non-persistent connection request to be close d after the request is processed by the data service system.

12. A method of managing connections to a data service system that is accessible through a plurality of access requests, comprising:

(A) classifying each of the access requests as either a persistent connection request or a non-persistent connection request based on a predetermined classification policy, wherein the predetermined classification policy allows classification of the access requests based on service classes assigned to user terminals transmitting the access requests;

(B) allowing a connection established for a persistent connection request from a first remote user terminal to remain open after the persistent connection request is processed by the data service system;

(C) causing a connection established for a non-persistent connection request from a second remote user terminal to be closed after the non-persistent connection request is processed by the data service system.

13. The method of claim 12, wherein the step (B) further comprises the step of determining if the persistent connection request is a last request from the first user terminal.

14. The method of claim 12, wherein the step (B) further comprises the steps of (I) allowing the connection to remain open if the persistent connection request is determined not to be a last request from the first user terminal;

(II) causing the connection to close if the persistent connection request is determined to be a last request from the first user terminal.

15. The method of claim 12, wherein the step (C) further comprises the step of modifying or marking the request so that the data service system closes the connection after the non-persistent connection request is processed.

16. A method of managing connections to a data service system that is accessible through a plurality of access requests and supports a predetermined number of persistent connections, comprising:

(A) classifying each of the access requests as either a persistent connection request or a non-persistent connection request based on a predetermined classification policy and classifying a subsequent access request as a non-persistent connection request when the persistent connections currently in the data service system exceed the predetermined number;

(B) allowing a connection established for a persistent connection request from a first remote user terminal to remain open after the persistent connection request is processed by the data service system;

(C) causing a connection established for a non-persistent connection request from a second remote user terminal to be closed after the non-persistent connection request is processed by the data service system.

17. A method of managing connections to a data service system that is accessible through a plurality of access requests, comprising:

(A) classifying each of the access requests as either a persistent connection request or a non-persistent connection request based on a predetermined classification policy, wherein the predetermined classification policy allows classification of the access requests based on access request sender addresses or domain names;

(B) allowing a connection established for a persistent connection request from a first remote user terminal to remain open after the persistent connection request is processed by the data service system;

(C) causing a connection established for a non-persistent connection request from a second remote user terminal to be closed after the non-persistent connection request is processed by the data service system.

18. A method of managing connections to a data service system that is accessible through a plurality of access requests, comprising:

(A) classifying each of the access requests as either a persistent connection request or a non-persistent connection request based on a predetermined classification policy, wherein the predetermined classification policy allows classification of the access requests based on a cookie or a browser plug-in value;

(B) allowing a connection established for a persistent connection request from a first remote user terminal to remain open after the persistent connection request is processed by the data service system;

(C) causing a connection established for a non-persistent connection request from a second remote user terminal to be closed after the non-persistent connection request is processed by the data service system.

19. A method of managing connections to a data service system that is accessible through a plurality of access requests, comprising:

(A) classifying each of the access requests as either a persistent connection request or a non-persistent connection request based on a predetermined classification policy, wherein the predetermined classification policy allows classification of the access requests based on a path name or a URL locator;

(B) allowing a connection established for a persistent connection request from a first remote user terminal to remain open after the persistent connection request is processed by the data service system;

(C) causing a connection established for a non-persistent connection request from a second remote user terminal to be closed after the non-persistent connection request is processed by the data service system.

20. A connection management system for a data service system that is accessible through a plurality of access requests, comprising a request classifier configured to classify each access request as either a persistent connection request or a non-persistent connection request in accordance with a predetermined classification policy, wherein the request classifier is configured to classify an access request received from a user terminal based upon a service class assigned to the user terminal; and a processor system configured to allow a connection established for a persistent connection request to remain open after the request is processed by the data service system and to allow a connection established for a non-persistent connection request to be closed after the request is processed by the data service system.

* * * * *